July 22, 1930.  I. F. BYRNES  1,771,375
OSCILLATION GENERATOR
Filed Aug. 6, 1926
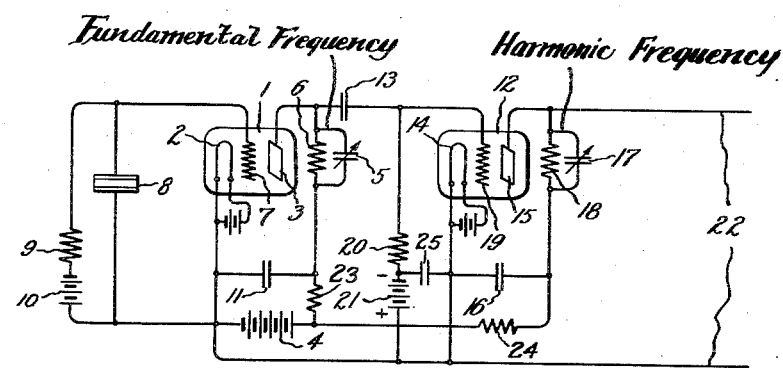
Inventor:
Irving F. Byrnes,
by
His Attorney.

Patented July 22, 1930

1,771,375

UNITED STATES PATENT OFFICE

IRVING F. BYRNES, OF SCHENECTADY, NEW YORK, ASSIGNOR TO GENERAL ELECTRIC COMPANY, A CORPORATION OF NEW YORK

OSCILLATION GENERATOR

Application filed August 6, 1926. Serial No. 127,658.

My invention relates to oscillators which have their frequency controlled by a piezo electric element, and has for its principal object the provision of an improved oscillator that is operable to supply current at a frequency much higher than the resonance frequency of the piezo electric element which controls the output frequency of the oscillator.

A piezo electric element is a small slab cut from a crystal of quartz or other suitable material in known relation to its optical and electrical axes. It is well known that such a slab or piezo electric element is capable of transforming mechanical energy to electrical energy, or vice versa, due to the electrical charges of different polarity produced at opposed faces of the element when it is subjected to mechanical stress, or due to the compression waves set up in the body of the element when it is subjected to the electrical stress of an alternating electrostatic field. Because of the fact that mechanical resonance in the vibration of the element is established when the frequency of the alternating electrostatic field corresponds to the frequency of the compression waves set up in the element, it is possible to utilize the element as a means of selecting or predetermining the frequency at which current is transmitted to or from a circuit.

The resonance frequency of a piezo electric element is dependent on and varies inversely as the thickness dimension of the element. A very thin and fragile piezo electric element is therefore required to control oscillators which deliver current at very high frequency. The manufacture of such elements involves many difficulties.

While no great difficulty is involved in reducing an element to almost any thickness desired, it is unlikely that a very thin element cut in the customary manner will respond to the frequency corresponding to its thickness rather than to the comparatively low frequency corresponding to its length. A further defect of very thin elements is that they are fragile and easily broken. For these reasons, piezo electric elements cut in the customary manner are unsuited for use under conditions where the frequency is high and corresponds to a very small dimension of the element.

In accordance with my invention, these difficulties are avoided by combining a comparatively thick piezo electric element with a plurality of circuits one of which is tuned to the resonance frequency of the element and another of which is tuned to a harmonic of this resonance frequency. My invention will be better understood from the following description when considered in connection with the accompanying drawing.

The drawing illustrates an oscillator wherein my invention has been embodied.

This oscillator comprises an electron discharge device 1 provided with a cathode 2 and an anode or plate 3 which are interconnected through a source 4 and a tuning element shown as a condenser 5 and a reactor 6. The device 1 is also provided with a grid 7 for controlling the transmission of current between its cathode 2 and anode 3. This grid is connected to the cathode 2 through parallel circuits one of which comprises a piezo electric element 8 and the other of which comprises a reactor 9 and a source of grid potential shown as a battery 10. It will be observed that a condenser 11 and a reactor 23 are provided for shunting high frequency currents past the source 4, and that the plate circuit of the device 1 is coupled to the grid circuit of an electron discharge device 12 through a condenser 13. The device 12 is provided with a cathode 14 and anode 15 which are interconnected both through a high frequency shunt 16 and through a circuit comprising the source 4, a reactor 24 for excluding high frequency current from the source 4, and a tuning element shown as a condenser 17, and a reactor 18. A condenser 25 may also be provided to facilitate the exclusion of high frequency current from the source 4. The device 12 also comprises a grid 19 which is connected to the cathode 14 through a reactor 20 and a source 21 whereby a negative bias potential is applied to the grid 19. With these connections, current is supplied from the source 4 to an output circuit 22 at a frequency dependent on the frequency characteristics of the piezo electric element 8.

Assuming the element 8 to be resonant to a wave of 200 meters and the plate circuit of device 1 to be tuned to this wave length, current will be transmitted through the device 1 at a frequency which corresponds to the dimensions of the element 8. The current delivered to the output circuit 22, however, will have a frequency dependent on the tuning of the plate circuit of the device 12. With proper adjustment of the condenser 17, the frequency of the output circuit 22 may therefore be made to correspond to a wave length of 40 meters or to any other desired short wave length. It will of course be understood that any desired number of stages may be utilized, each successive stage being tuned to the same or a different harmonic of the frequency of the stage which immediately precedes it. My invention thus makes it possible to operate the circuit 22 at a high frequency of constant value while avoiding the various difficulties encountered in the manufacture and use of very thin piezo electric elements.

A further advantage of the circuit arrangement illustrated is that the radio frequency amplifier does not require neutralization. In other words, due to the fact that the grid circuit is tuned for one frequency and the plate circuit of vacuum tube 12 is tuned for another frequency, there is no tendency for the tube to oscillate. This is an important advantage in short wave radio frequency amplifiers, as neutralization always involves more or less difficulty.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. An oscillator comprising a pair of electron discharge devices provided with anode circuits tuned respectively to fundamental and harmonic frequencies and with grid circuits, means for coupling one of said anode circuits to one of said grid circuits, and a single piezo electric element resonant to said fundamental frequency and connected in the other of said grid circuits for preventing variation in the frequencies of the currents in said tuned circuits.

2. An oscillator comprising a pair of electron discharge devices provided with anode circuits tuned respectively to fundamental and harmonic frequencies and with grid circuits, means comprising a condenser for coupling one of said anode circuits to one of said grid circuits, and a single piezo electric element resonant to said fundamental frequency and connected in the other of said grid circuits for preventing variation in the frequencies of the currents in said tuned circuits.

3. An oscillator comprising a pair of electron discharge devices provided with anode circuits tuned respectively to fundamental and harmonic frequencies and with grid circuits, means for coupling one of said anode circuits to one of said grid circuits, a single piezo electric element resonant to said fundamental frequency and connected in the other of said grid circuits for preventing variation in the frequencies of the currents in said tuned circuits, a source of current connected in said anode circuits, and a high frequency shunt connected to the terminals of said source.

4. The combination of an electron discharge device comprising a grid, a cathode and an anode, an anode circuit connected between said cathode and anode, a single piezo electric element connected in circuit with said grid, and a second electron discharge device provided with a grid circuit coupled to said anode circuit and with an anode circuit tuned to a frequency which is a harmonic of the resonant frequency of said element.

5. The combination of a tuned circuit, an electron discharge device provided with a cathode and anode connected in said circuit and with a grid for controlling the transmission of current between said cathode and anode, a single piezo electric element connected between said cathode and grid, and a second electron discharge device provided with a grid circuit coupled to said tuned circuit and with an anode circuit tuned to a frequency which is different from the resonant frequency of said element.

6. An oscillator comprising a pair of electron discharge devices provided with anode circuits tuned respectively to fundamental and harmonic frequencies and with grid circuits, means for coupling one of said anode circuits to one of said grid circuits, and a piezo electric element resonant to said fundamental frequency and connected in the other of said grid circuits for preventing variation in the frequencies of the currents in said tuned circuits.

In witness whereof, I have hereunto set my hand this 5th day of August, 1926.

IRVING F. BYRNES.